US012407976B2

(12) United States Patent
Ren et al.

(10) Patent No.: US 12,407,976 B2
(45) Date of Patent: Sep. 2, 2025

(54) COAXIAL EARPHONE CORE

(71) Applicant: AAC Microtech (Changzhou) Co., Ltd., Jiangsu (CN)

(72) Inventors: Zhang Ren, Changzhou (CN); Zhiwei Zhong, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 244 days.

(21) Appl. No.: 18/324,183

(22) Filed: May 26, 2023

(65) Prior Publication Data

US 2024/0187782 A1 Jun. 6, 2024

Related U.S. Application Data

(63) Continuation of application No. PCT/CN2022/136717, filed on Dec. 6, 2022.

(51) Int. Cl.

| | |
|---|---|
| ***H04R 1/24*** | (2006.01) |
| ***H04R 7/12*** | (2006.01) |
| ***H04R 7/18*** | (2006.01) |
| ***H04R 9/02*** | (2006.01) |
| ***H04R 9/04*** | (2006.01) |
| ***H04R 9/06*** | (2006.01) |

(52) U.S. Cl.

CPC ............... *H04R 1/24* (2013.01); *H04R 7/127* (2013.01); *H04R 7/18* (2013.01); *H04R 9/025* (2013.01); *H04R 9/045* (2013.01); *H04R 9/063* (2013.01); *H04R 2400/11* (2013.01)

(58) Field of Classification Search

CPC ...... H04R 25/656; H04R 25/554; H02J 50/10

See application file for complete search history.

(56) References Cited

FOREIGN PATENT DOCUMENTS

CN 217721454 U * 11/2022 ............. H04R 9/025

* cited by examiner

*Primary Examiner* — Sunita Joshi

(74) *Attorney, Agent, or Firm* — Wiersch Law Group

(57) ABSTRACT

The present disclosure discloses a coaxial earphone core including a magnet system, which includes a first yoke, a first magnet, a second magnet surrounding the first magnet to form a first magnetic gap, a second yoke fixed to the first magnet, and an annular third magnet fixed to the second yoke; the second yoke includes an extending wall bending and extending into the third magnet; the extending wall is spaced apart from the third magnet to form a second magnetic gap; the first coil and the second coil are inserted into the first magnetic gap and second magnetic gap, respectively; the first sound unit surrounds the second sound unit, the second diaphragm is located on one side of the first diaphragm facing the magnet system. The coaxial earphone core has better sound quality.

9 Claims, 4 Drawing Sheets

A-A

B

COAXIAL EARPHONE CORE

FIELD OF THE PRESENT DISCLOSURE

The present disclosure relates to electric-sound conversion technologies, especially relates to a coaxial earphone core.

DESCRIPTION OF RELATED ART

With the development of the mobile communication technologies, consumers are increasingly using mobile communication devices with voice function, and earphones have become one of the essential communication devices in people's daily life and work. Delicate appearance, wearing convenience, excellent sound quality and stereo perception are necessary characteristics for the earphones. Therefore, further improving the performance and internal structure of earphones has become a topic worth studying at present.

In related art, normally one magnet system provided in the earphone core is configured to provide sound effect in mid-frequency and low frequency. To provide sound effect in high frequency, two coaxial magnet systems and vibration systems is necessary. Stacking the two magnet systems may increase the axial height of the earphone, thus reducing the manufacture convenience and applicability. Besides, the diaphragm of one vibration system surrounds the diaphragm of another vibration system, reducing the effective vibration area of the outer diaphragm and weakening the sound quality of the earphone core.

Therefore, it is necessary to provide an improved earphone core to overcome the problems mentioned above.

SUMMARY OF THE INVENTION

One object of the present disclosure is to provide a coaxial earphone core having better sound quality.

A coaxial earphone core includes a first frame; a second frame; a magnet system, including: a first yoke fixed to the first frame; a first magnet fixed to the first yoke; a second magnet surrounding the first magnet to form a first magnetic gap; a second yoke fixed on one side of the first magnet away from the first yoke; an annular third magnet fixed to the second yoke; a first sound unit, including: a first diaphragm peripherally mounted on the first frame; and a first coil fixed to the first diaphragm and inserted into the first magnetic gap; a second sound unit coaxially surrounded by the first sound unit, including: a second diaphragm mounted on the second frame; and a second coil fixed to the second diaphragm; the second frame is fixed on one side of the third magnet away from the second yoke; the second yoke includes an annular extending wall bending and extending into the third magnet; the extending wall is spaced apart from the third magnet to form a second magnetic gap; the second coil is inserted into the second magnetic gap; the second diaphragm is located on one side of the first diaphragm facing the magnet system along a vibration direction.

As an improvement, the first diaphragm includes an annular inner diaphragm located in a central position, a first dome surrounding the first inner diaphragm, a first skeleton surrounding the first dome, and an first outer diaphragm surrounding the first skeleton; the second diaphragm is located on one side of the first inner diaphragm facing the magnet system along the vibration direction.

As an improvement, the coaxial earphone core further includes a front cover is arranged above the second diaphragm; an inner edge of the first inner diaphragm is fixed to the front cover.

As an improvement, a sound hole opposite the second diaphragm is provided on the front cover penetrating thereon along the vibration direction.

As an improvement, the front cover includes an outer periphery located outside the second frame, an inner periphery enclosing the sound hole, and a central portion connecting the inner periphery and the outer periphery; the outer periphery is mounted on a side of the third magnet away from the second yoke.

As an improvement, the inner edge of the first inner diaphragm is fixed to the central portion.

As an improvement, the first coil is fixed to a side of the first skeleton facing the first magnetic gap.

As an improvement, the first dome includes a first connection portion connecting with the outer edge of the first inner diaphragm, a second connection portion connecting with the first skeleton, and an extending portion connecting the first connection portion with the second connection portion; the extending portion extends from the second connection portion and along a direction towards a first connection portion and away from the second diaphragm.

As an improvement, the inner periphery of the front cover bends from the central portion and extends along a direction away from the second diaphragm into the first inner diaphragm; the inner edge of the first inner diaphragm surrounds the inner periphery.

As an improvement, the coaxial earphone core further includes a support member fixed to the magnet system; the first yoke comprises a first through hole penetrating thereon along the vibration direction; the support member includes a first support portion received in the first through hole and fixed to the first yoke, a second support portion extending from the first support portion and towards the second diaphragm, and a third support portion extending from the second support portion and towards the second diaphragm; the second support portion extends into the first magnet; the third support portion extends into the extending wall of the second yoke.

BRIEF DESCRIPTION OF THE DRAWINGS

The present disclosure will hereinafter be described in detail with reference to an exemplary embodiment. To make the technical problems to be solved, technical solutions and beneficial effects of present disclosure more apparent, the present disclosure is described in further detail together with the figures and the embodiment. It should be understood the specific embodiment described hereby is only to explain this disclosure, not intended to limit this disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
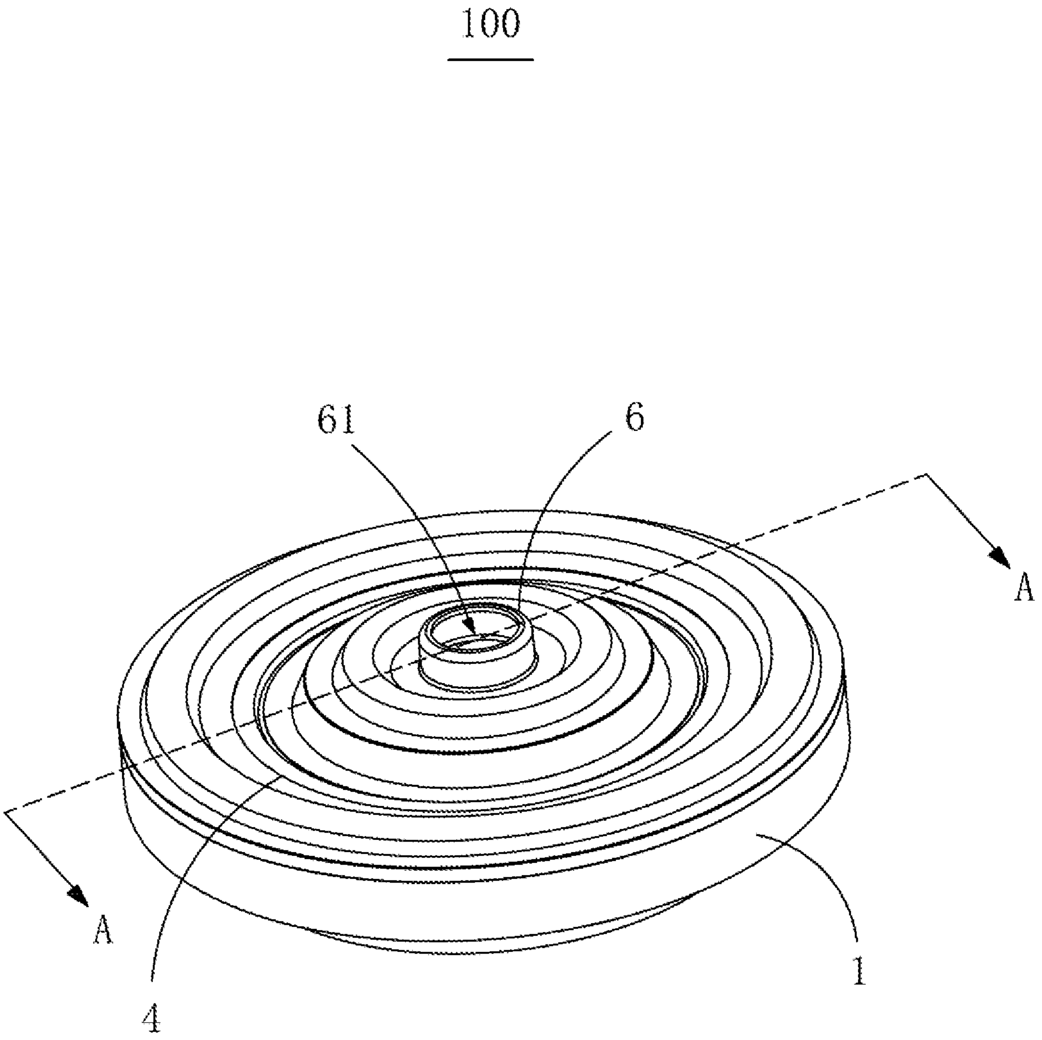
FIG. 1 is an isometric view of a coaxial earphone core in accordance with an exemplary embodiment of the present disclosure.
Figure 2:
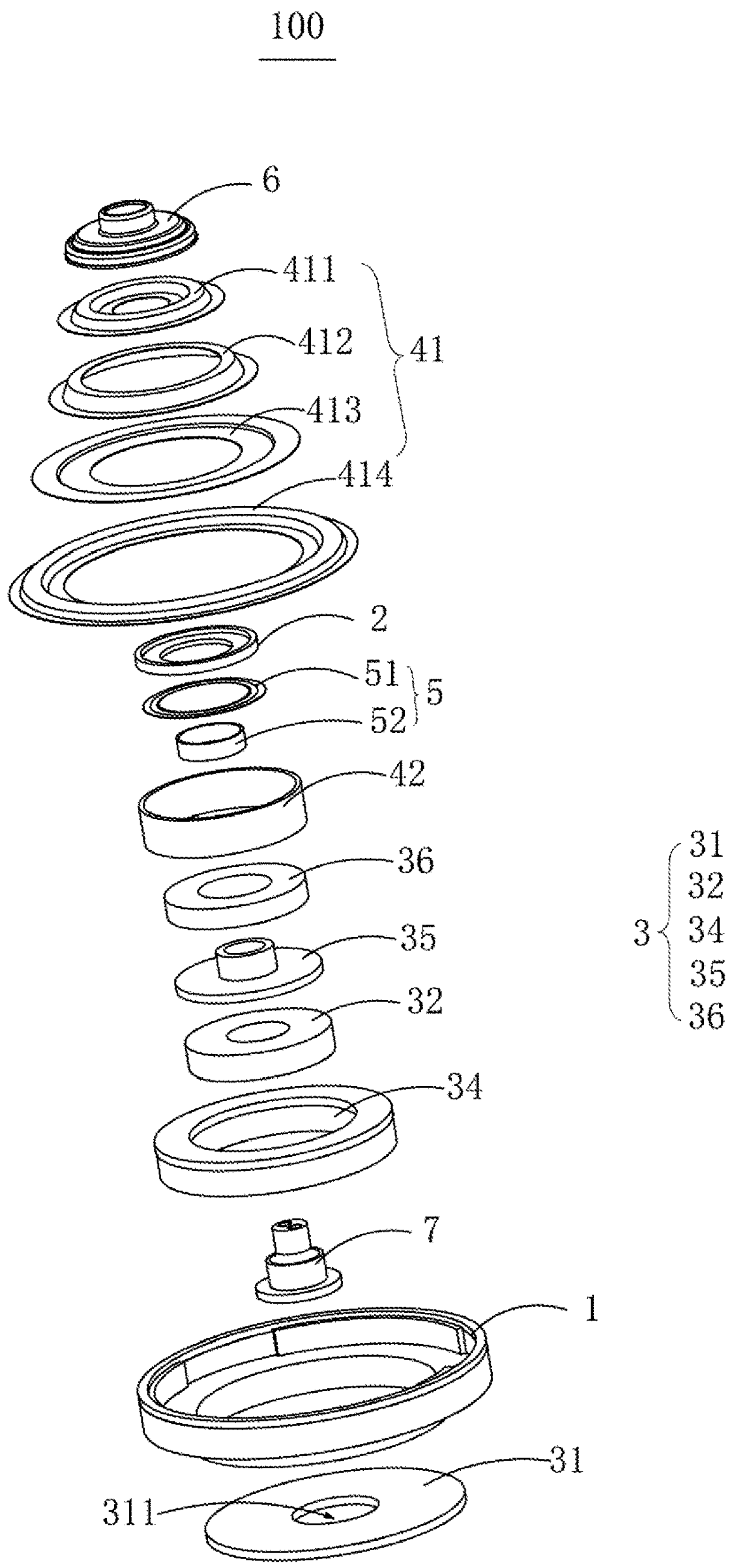
FIG. 2 is an exploded view of the coaxial earphone core in FIG. 1.
Figure 3:
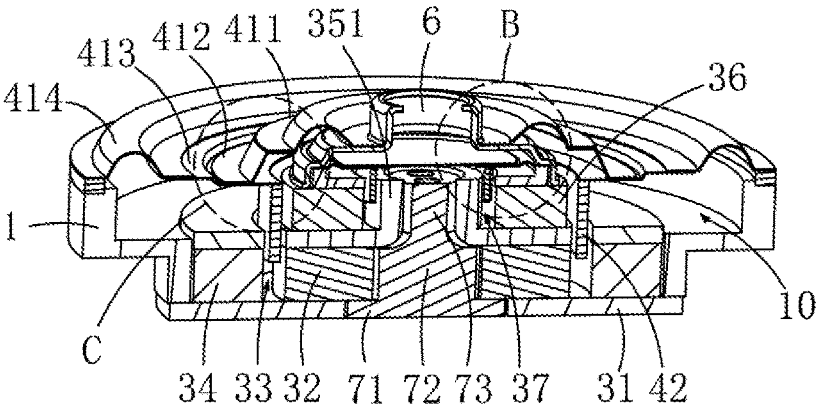
FIG. 3 is a cross-sectional view of the coaxial earphone core taken along line A-A in FIG. 1.
Figure 4:
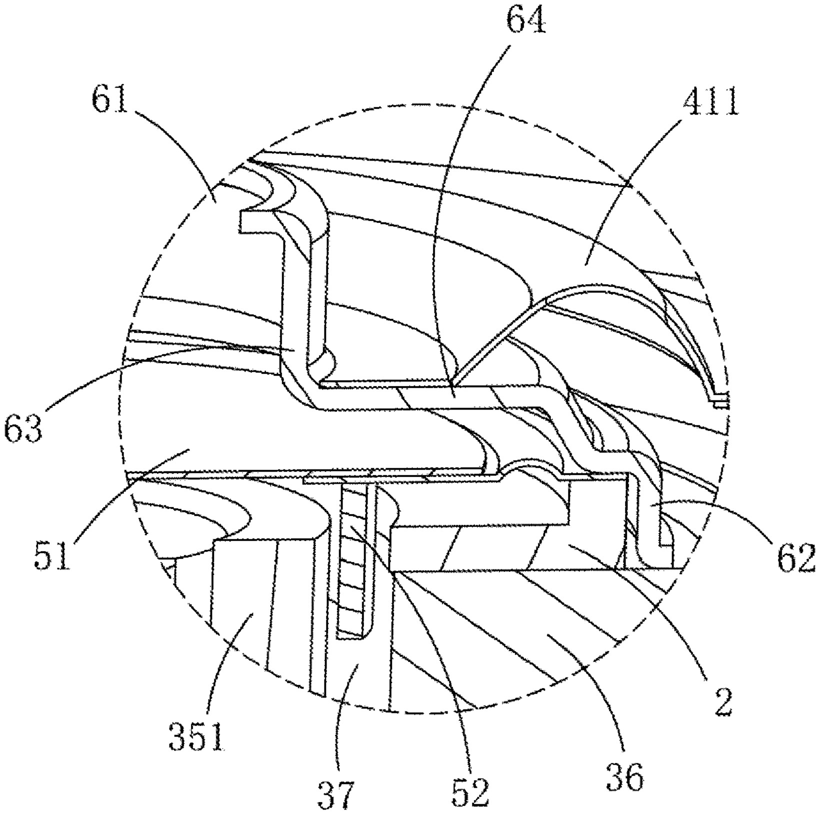
FIG. 4 is an enlarged view of the part B in FIG. 3.
Figure 5:
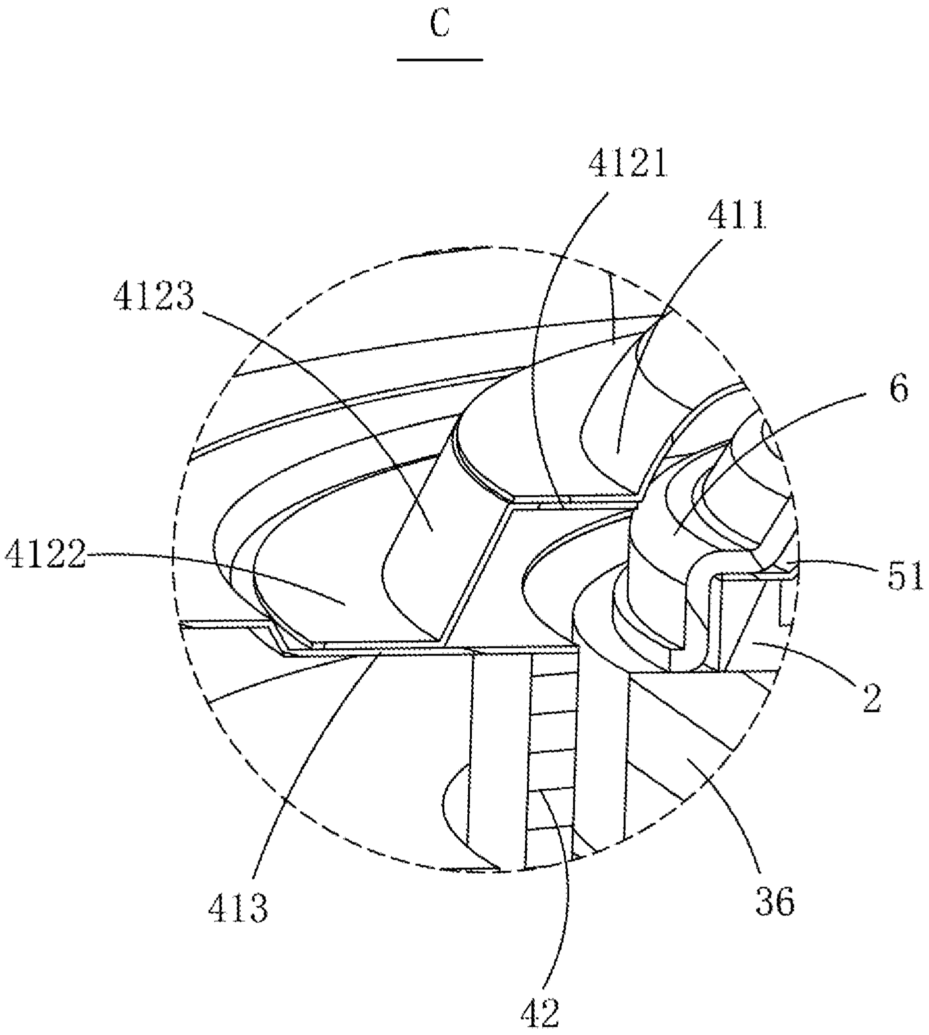
FIG. 5 is an enlarged view of the part C in FIG. 3

Please refer to FIGS. 1-5, a coaxial earphone core 100 provided by an exemplary embodiment of the present disclosure includes a first frame 1, a second frame 2, a magnet system 3, a first sound unit 4, and a second sound unit 5 coaxially surrounded by the first sound unit 4. The first frame 1 surrounds the second frame 2. The first sound unit 4 surrounds the second sound unit 5.

The first sound unit 4 includes a first diaphragm 41 peripherally mounted on the first frame 1, and a first coil 42 fixed to the first diaphragm 41. The first coil 42 is configured to drive the first diaphragm 41 to generate sound.

The second sound unit 5 includes a second diaphragm 51 mounted on the second frame 2, and a second coil 52 fixed to the second diaphragm 51. The second coil 52 drives the second diaphragm 51 to generate sound. In one embodiment, the first sound unit 4 is configured to generate sound in low frequency and mid-frequency; the second sound unit 5 is configured to generate sound in high frequency. Therefore, the coaxial earphone core 100 can provide sound effect in full frequency band.

Specifically, the magnet system 3 includes a first yoke 31 fixed to the first frame 1, a first magnet 32 fixed to the first yoke 31, a second magnet 34 surrounding the first magnet 32 to form a first magnetic gap 33, a second yoke 35 fixed on one side of the first magnet 32 away from the first yoke 31, and an annular third magnet 36 fixed to the second yoke 35. The first coil 42 is inserted into the first magnetic gap 33. The second frame 2 is fixed on one side of the third magnet 36 away from the second yoke 35. In addition, the second yoke 35 includes an annular extending wall 351 bending and extending into the third magnet 36; the extending wall 351 is spaced apart from the third magnet 36 to form a second magnetic gap 37; the second coil 52 is inserted into the second magnetic gap 37; the second diaphragm 51 is located on one side of the first diaphragm 41 facing the magnet system 3 along a vibration direction.

Specifically, the first diaphragm 41 includes an annular inner diaphragm 411 located in a central position, a first dome 412 surrounding the first inner diaphragm 411, a first skeleton 413 surrounding the first dome 412, and an first outer diaphragm 414 surrounding the first skeleton 413; the second diaphragm 51 is located on one side of the first inner diaphragm 411 facing the magnet system 3 along the vibration direction. The first coil 42 is fixed to a side of the first skeleton 413 facing the first magnetic gap 33. Furthermore, the first dome 412 includes a first connection portion 4121 connecting with the outer edge of the first inner diaphragm 411, a second connection portion 4122 connecting with the first skeleton 413, and an extending portion 4123 connecting the first connection portion 4121 with the second connection portion 4122; the extending portion 4123 extends from the second connection portion 4122 and along a direction towards a first connection portion 4121 and away from the second diaphragm 51. Therefore, the second sound unit 5 is arranged below the first diaphragm 41 of the first sound unit 4, fully utilizing the space below the first diaphragm 41, improving the space utilization, effectively reducing the axial height of the coaxial earphone core 100 and improving the applicability of the coaxial earphone core 100. Besides, the second diaphragm 51 is located below the first diaphragm 41, ensuring enough vibration area of the first diaphragm 41 and effectively improving the sound quality of the coaxial earphone core.

Furthermore, the coaxial earphone core 100 includes a front cover 6 arranged above the second diaphragm 51; an inner edge of the first inner diaphragm 411 is fixed to the front cover 6. It can be understood that a sound hole 61 opposite the second diaphragm 51 is provided on the front cover 6 penetrating thereon along the vibration direction. The sound generated by the second diaphragm 51 is transmitted to outside through the sound hole 61.

Specifically, the front cover 6 includes an outer periphery 62 located outside the second frame 2, an inner periphery 63 enclosing the sound hole 61, and a central portion 64 connecting the inner periphery 63 and the outer periphery 62; the outer periphery 62 is mounted on a side of the third magnet 36 away from the second yoke 35. The inner edge of the first inner diaphragm 422 is fixed to the central portion 64. Furthermore, the inner periphery 63 of the front cover 6 bends from the central portion 64 and extends along a direction away from the second diaphragm 51 into the first inner diaphragm 411; the inner edge of the first inner diaphragm 411 surrounds the inner periphery 63.

The coaxial earphone core 100 further includes a support member 7 fixed to the magnet system 3; the first yoke 31 includes a first through hole 311 penetrating thereon along the vibration direction; the support member 7 includes a first support portion 71 received in the first through hole 311 and fixed to the first yoke 31, a second support portion 72 extending from the first support portion 71 and towards the second diaphragm 51, and a third support portion 73 extending from the second support portion 72 and towards the second diaphragm 51; the second support portion 72 extends into the first magnet 32; the third support portion 73 extends into the extending wall 351 of the second yoke 35. It can be understood that the third support portion 73 is opposite to and spaced apart from the second diaphragm 51 along the vibration direction.

Compared with the related art, the magnet system of the coaxial earphone core in the application includes a first yoke, a first magnet, a second magnet surrounding the first magnet to form a first magnetic gap, a second yoke fixed to the first magnet, and an annular third magnet fixed to the second yoke; the second yoke includes an extending wall bending and extending into the third magnet; the extending wall is spaced apart from the third magnet to form a second magnetic gap; the first coil and the second coil are inserted into the first magnetic gap and second magnetic gap, respectively; the first sound unit surrounds the second sound unit, the second diaphragm is located on one side of the first diaphragm facing the magnet system. The coaxial earphone core fully utilizes the space below the first diaphragm, thus improving the space utilization, effectively reducing the axial height of the coaxial earphone core, and improving its applicability. Besides, the first diaphragm has enough vibration area, effectively improving the sound quality of the coaxial earphone core.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A coaxial earphone core comprising:
a first frame;
a second frame;
a magnet system, comprising:
a first yoke fixed to the first frame;
a first magnet fixed to the first yoke;
a second magnet surrounding the first magnet to form a first magnetic gap;
a second yoke fixed on one side of the first magnet away from the first yoke;
an annular third magnet fixed to the second yoke;
a first sound unit, comprising:
a first diaphragm peripherally mounted on the first frame; and
a first coil fixed to the first diaphragm and inserted into the first magnetic gap;
a second sound unit coaxially surrounded by the first sound unit, comprising:
a second diaphragm mounted on the second frame; and
a second coil fixed to the second diaphragm; wherein
the second frame is fixed on one side of the third magnet away from the second yoke; the second yoke comprises an annular extending wall bending and extending into the third magnet; the extending wall is spaced apart from the third magnet to form a second magnetic gap; the second coil is inserted into the second magnetic gap; the second diaphragm is located on one side of the first diaphragm facing the magnet system along a vibration direction;
the first diaphragm comprises an annular inner diaphragm located in a central position, a first dome surrounding the first inner diaphragm, a first skeleton surrounding the first dome, and an first outer diaphragm surrounding the first skeleton; the second diaphragm is located on one side of the first inner diaphragm facing the magnet system along the vibration direction.

2. The coaxial earphone core as described in claim 1, further comprising a front cover is arranged above the second diaphragm; an inner edge of the first inner diaphragm is fixed to the front cover.

3. The coaxial earphone core as described in claim 2, wherein a sound hole opposite the second diaphragm is provided on the front cover penetrating thereon along the vibration direction.

4. The coaxial earphone core as described in claim 3, wherein the front cover comprises an outer periphery located outside the second frame, an inner periphery enclosing the sound hole, and a central portion connecting the inner periphery and the outer periphery; the outer periphery is mounted on a side of the third magnet away from the second yoke.

5. The coaxial earphone core as described in claim 4, wherein the inner edge of the first inner diaphragm is fixed to the central portion.

6. The coaxial earphone core as described in claim 5, wherein the first coil is fixed to a side of the first skeleton facing the first magnetic gap.

7. The coaxial earphone core as described in claim 1, wherein the first dome comprises a first connection portion connecting with the outer edge of the first inner diaphragm, a second connection portion connecting with the first skeleton, and an extending portion connecting the first connection portion with the second connection portion; the extending portion extends from the second connection portion and along a direction towards a first connection portion and away from the second diaphragm.

8. The coaxial earphone core as described in claim 4, wherein the inner periphery of the front cover bends from the central portion and extends along a direction away from the second diaphragm into the first inner diaphragm; the inner edge of the first inner diaphragm surrounds the inner periphery.

9. The coaxial earphone core as described in claim 1, wherein further comprising a support member fixed to the magnet system; the first yoke comprises a first through hole penetrating thereon along the vibration direction; the support member comprises a first support portion received in the first through hole and fixed to the first yoke, a second support portion extending from the first support portion and towards the second diaphragm, and a third support portion extending from the second support portion and towards the second diaphragm; the second support portion extends into the first magnet; the third support portion extends into the extending wall of the second yoke.

* * * * *